(12) United States Patent
Krimminger

(10) Patent No.: US 6,591,592 B1
(45) Date of Patent: Jul. 15, 2003

(54) ROTATING MOWER ASSEMBLY

(76) Inventor: Billy Ray Krimminger, 5612 Shoreview Dr., Concord, NC (US) 28035

( * ) Notice: Subject to any disclaimer, the term of this patent is extended or adjusted under 35 U.S.C. 154(b) by 0 days.

(21) Appl. No.: 10/139,523

(22) Filed: May 6, 2002

(51) Int. Cl.⁷ .............................................. A01D 75/18
(52) U.S. Cl. ......................... 56/10.4; 56/13.6; 56/13.7
(58) Field of Search ........................... 56/10.6, 6, 13.6, 56/13.7, 17.4, 10.4, DIG. 16, DIG. 22

(56) References Cited

U.S. PATENT DOCUMENTS

| | | | | |
|---|---|---|---|---|
| 2,960,811 A | * | 11/1960 | Roesel | 56/10.4 |
| 3,077,718 A | * | 2/1963 | McLaughlin | 56/17.1 |
| 3,115,739 A | * | 12/1963 | Thoen et al. | 56/6 |
| 3,526,083 A | * | 9/1970 | Barry et al. | 56/10.7 |
| 3,797,209 A | * | 3/1974 | Davis | 56/13.6 |
| 4,326,570 A | * | 4/1982 | Fridley et al. | 144/336 |
| 4,573,306 A | * | 3/1986 | Smith et al. | 56/10.4 |
| 5,065,566 A | * | 11/1991 | Gates | 56/12.7 |
| 5,167,108 A | * | 12/1992 | Bird | 56/13.7 |
| 5,471,824 A | * | 12/1995 | Neely | 56/10.4 |
| 6,301,863 B1 | | 10/2001 | Liebrecht | |
| 6,397,572 B1 | * | 6/2002 | Roundy et al. | 56/13.7 |
| 6,430,906 B1 | * | 8/2002 | Eddy | 56/13.7 |

* cited by examiner

*Primary Examiner*—Árpád Fab Kovács
(74) *Attorney, Agent, or Firm*—Adams Evans P.A.

(57) ABSTRACT

A mower assembly including a platform for being mounted on one side of a mobile machine and a housing concentrically mounted on the platform for rotation relative thereto. A drive assembly is positioned in the housing and is driven by a power supply. A blade is also included for being rotated by the drive assembly. A latch assembly is mounted on the housing for movement between a latched position for maintaining the housing in a stationary position relative to the platform in the absence of a laterally-directed force on the latch assembly, and an unlatched position for permitting the housing to rotate around the platform in the presence of a laterally-directed force on the latch assembly. This permits the blade to cut vegetation growing around the stationary object as the mobile machine continues in a straight line path.

25 Claims, 15 Drawing Sheets

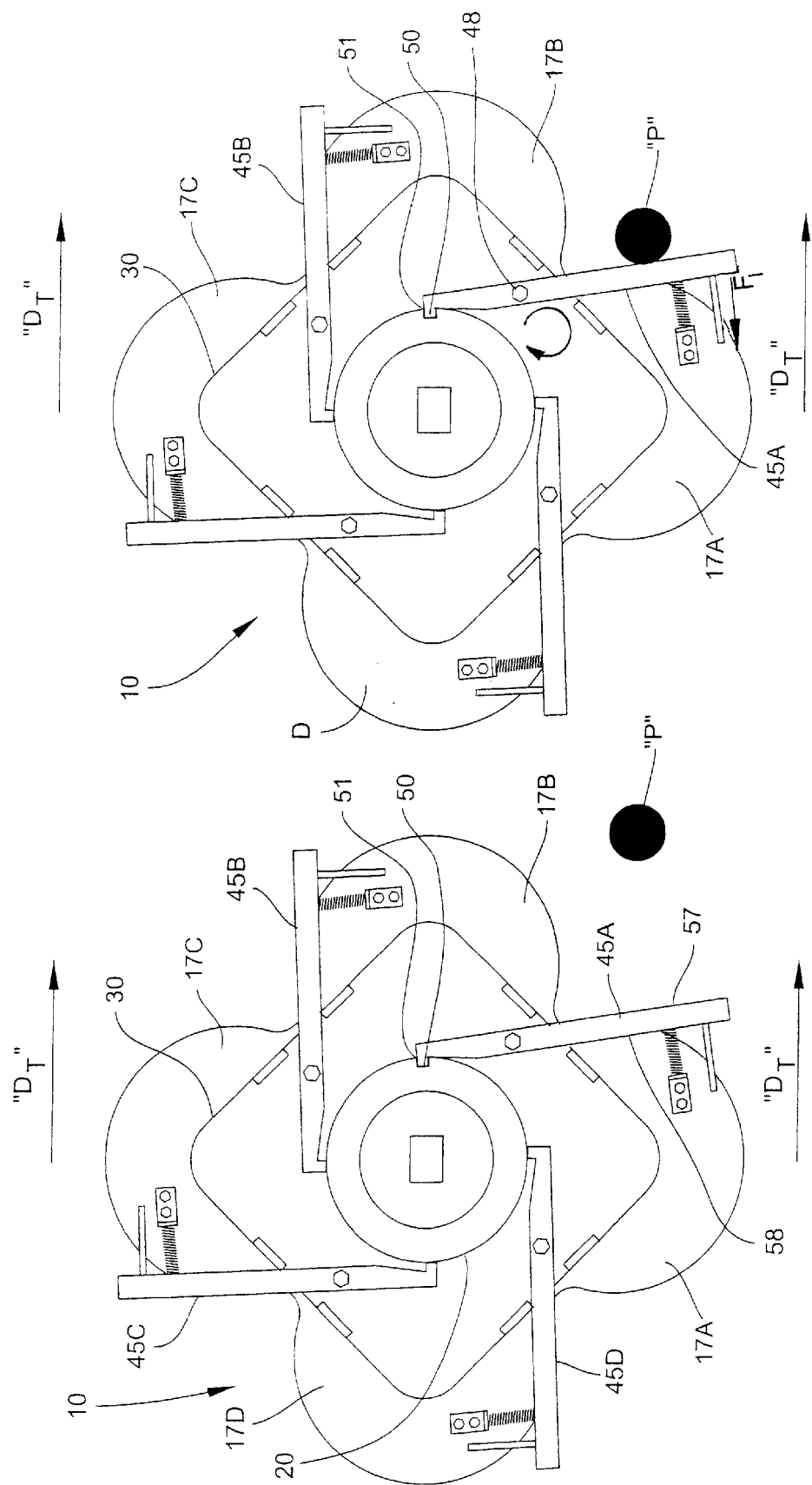

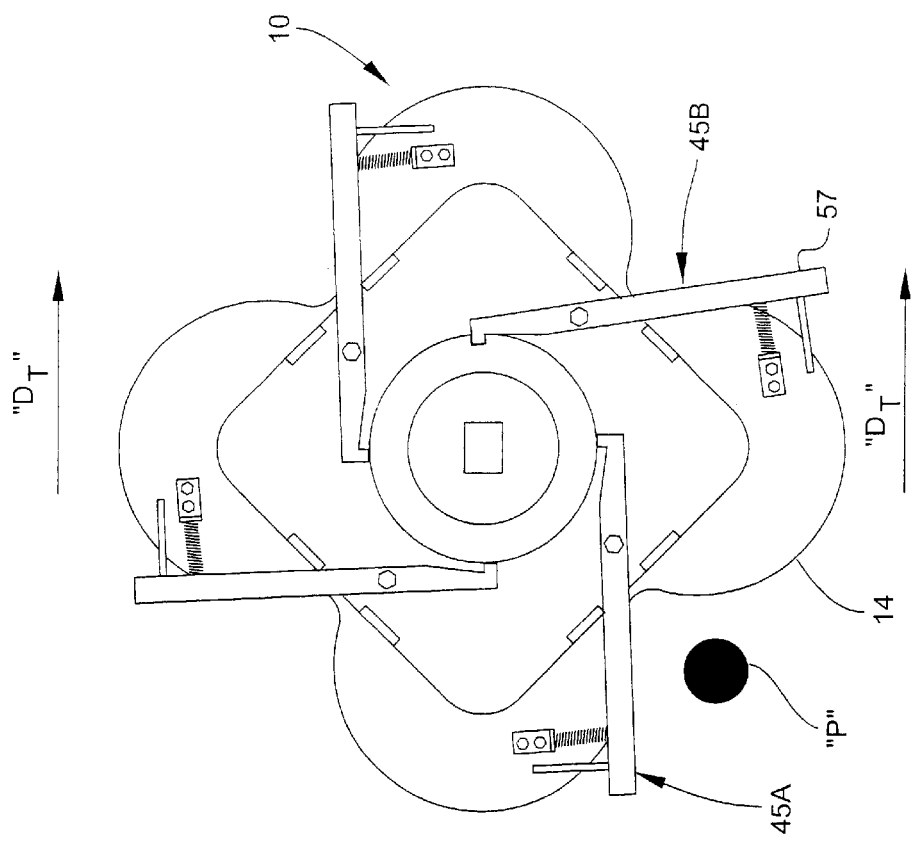
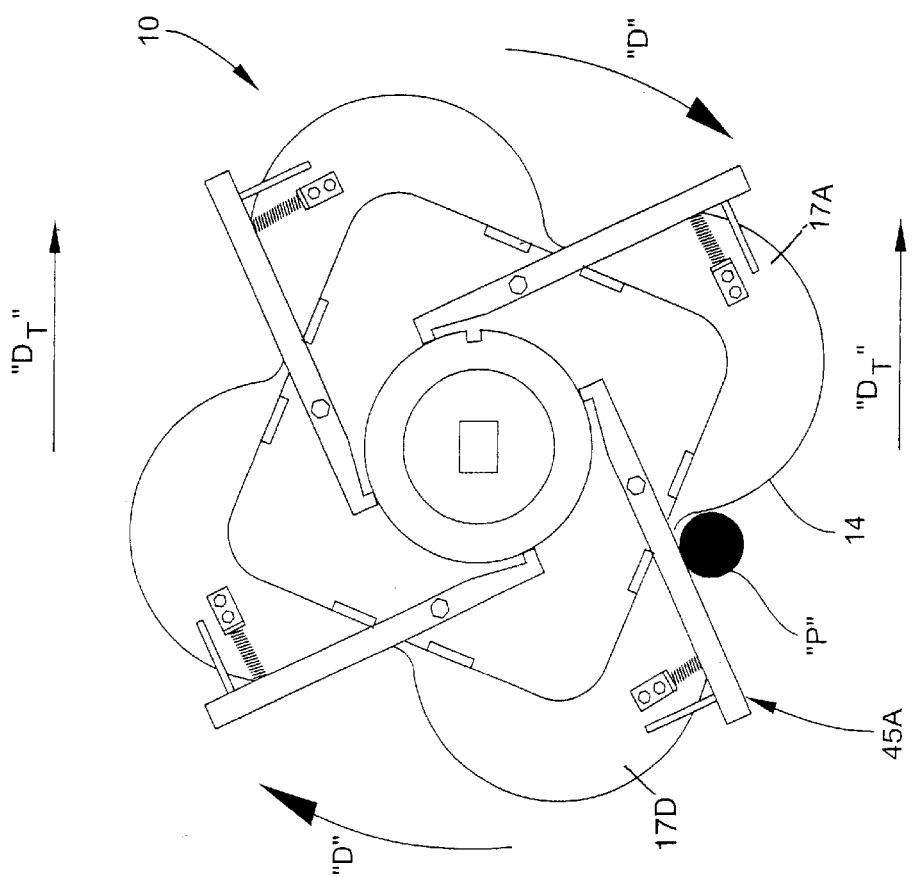
Fig. 13F
Fig. 13E

ROTATING MOWER ASSEMBLY

TECHNICAL FIELD AND BACKGROUND OF THE INVENTION

This invention relates to a rotating mower assembly for mowing around stationary objects. Such stationary objects include, but are not limited to, posts, trees and the like. In particular, the mower of the present invention is designed for being mounted on a side or rear mount hydraulic boom on a tractor or other mobile machine and used to mow beneath guard rails and around guard rail posts along roadsides.

Although prior art mowers and mower attachments exist for mowing along roadsides, such mowers present a number of disadvantages. For example, while a conventional flail mower can mow beneath guard rails and fences, a flail mower cannot mow around a post without requiring that the direction of travel of the mobile machine upon which the flail mower is mounted be changed so that the flail mower can be repositioned relative to the post. Even if such a mower is successfully moved around the post, the area adjacent the post must be mowed a second time using a handheld trimmer, or herbicides or other hazardous substances must be applied to the area adjacent the post to destroy any vegetation that the flail mower could not reach.

The invention of the present application overcomes the problems associated with prior art mowers by providing a unique mower assembly featuring multiple cutting blades that rotate relative to a central drive assembly in response to a collision of the mower with a stationary object. The mower assembly is capable of rotating in 90° increments around stationary obstacles, which results in a mowing pattern around leaving a significantly decreased area of vegetation unmowed. The mowing pattern is so precise that supplemental trimming and/or the use of herbicides or other harmful chemicals to remove unmowed vegetation is substantially reduced. The unique mower of the present application reduces the costs and hazards associated with applying herbicides or trimming by hand, and increases the speed and efficiency of the mowing process.

SUMMARY OF THE INVENTION

It is therefore an object of the present invention to provide a mower assembly capable of mowing beneath guard or fence rails and around respective guard or fence posts without altering the path of travel of the mobile machine to which the mowing assembly is connected.

It is another object of the present invention to provide a mower assembly that includes cutting members mounted on a deck that selectively rotates to prevent the cutting members from colliding with obstacles fixed in the path of the mowing assembly.

It is another object of the present invention to provide a mower assembly that trims vegetation growing adjacent obstacles such as guard rails and fence posts, thereby eliminating the need to apply herbicides or other hazardous substances to destroy the vegetation.

It is another object of the present invention to provide a mower assembly which is a safe alternative to the use of conventional herbicides or other hazardous substances for controlling growth of vegetation around obstacles positioned in fields or other open areas.

It is another object of the present invention to provide a mower assembly that significantly reduces the need to expend additional labor and resources for trimming around guard rails and fence posts after the initial mowing process is completed.

These and other objects of the present invention are achieved in the preferred embodiments disclosed below by providing a mower assembly for cutting vegetation in an open area and around intermittent stationary objects such as poles or posts. The mower assembly includes a stationary platform for being mounted to one side of a mobile machine and a housing concentrically mounted on the platform for rotation relative thereto. A drive assembly is positioned in the housing and is operatively connected to and driven by a power supply. A blade is also included for being rotated by the drive assembly. A latch assembly is mounted on the housing for movement between a latched position for maintaining the housing in a stationary position relative to the platform in the absence of a laterally-directed force on the latch assembly, and an unlatched position for permitting the housing to rotate around the platform in the presence of a laterally-directed force on the latch assembly by a stationary object as the mower assembly passes to one side of the object. This permits the blade to cut vegetation growing around the stationary object as the mobile machine continues in a straight line path.

According to one preferred embodiment of the invention, the latch assembly includes a plurality of spaced-apart levers slidably engaging an outer sidewall of the platform for moving the latch assembly between the latched and unlatched positions.

According to another preferred embodiment of the invention, each of the levers has a first end for receiving the laterally-directed force, and a second end for being selectively received within a complementary notch defined by the outer sidewall.

According to yet another preferred embodiment of the invention, each of the levers is mounted on the housing using a pivot positioned intermediate the first and second ends for permitting pivotal movement of the lever relative to the housing in response to an increase or decrease in the laterally-directed force on the first end.

According to yet another preferred embodiment of the invention, a post is attached to the first end of each lever and extends outwardly away therefrom for guiding vegetation beneath the housing as the lever pivots relative thereto.

According to yet another preferred embodiment of the invention, the first end of the lever includes a vertically-oriented planar surface adapted for abutting engagement with the stationary object, thereby producing the laterally-directed force and moving the latch assembly to the unlatched position.

According to yet another preferred embodiment of the invention, each of the levers includes a spring mounted on the housing adjacent the first end and extending perpendicularly to the planar surface for maintaining the second end of the lever in a tensioned condition against the platform in the absence of the laterally-directed force on the planar surface.

The spring is preferably a compression spring. According to yet another preferred embodiment of the invention, the second end is a hooked tip.

According to yet another preferred embodiment of the invention, the power supply is a motor mounted on the platform.

The motor is preferably a hydraulic motor.

According to yet another preferred embodiment of the invention, the motor is operatively connected to and driven by a power supply positioned on the mobile machine.

According to yet another preferred embodiment of the invention, the drive assembly includes a centrally-positioned drive shaft extending through the platform and interconnecting the motor with the blade for rotating the blade.

According to yet another preferred embodiment of the invention, the housing includes an upper compartment in which the drive assembly is positioned and a lower deck beneath which the blade is positioned.

According to yet another preferred embodiment of the invention, the lower deck includes quadriform platform having a peripheral side edge to which a downwardly-extending skirt is connected, thereby defining an interior within which the blade is positioned.

According to yet another preferred embodiment of the invention, the mower assembly includes a plurality of blades rotatably mounted on an underside of the quadriform platform for being rotated by the drive assembly.

According to yet another preferred embodiment of the invention, the drive assembly includes a drive pulley carried on the drive shaft and a plurality of driven pulleys carried on respective driven shafts. The driven pulleys are interconnected by an endless drive belt for rotation with the drive pulley.

According to yet another preferred embodiment of the invention, the drive assembly further includes a plurality of driven shafts operatively connected to the drive shaft for rotation therewith.

According to yet another preferred embodiment of the invention, the drive assembly includes a drive pulley positioned in the upper compartment and carried by the drive shaft for rotation therewith.

According to yet another preferred embodiment of the invention, each of the driven shafts includes a first end positioned within the upper compartment and upon which a driven pulley is mounted, and a second end positioned beneath the lower deck and upon which a respective one of the blades is mounted, thereby permitting the blade to rotate simultaneously with the rotation of the drive shaft.

According to yet another preferred embodiment of the invention, the drive and driven pulleys are interconnected by an endless drive belt, thereby permitting the blades to rotate with the drive shaft.

According to yet another preferred embodiment of the invention, a mower assembly is provided for cutting vegetation in an open area and around intermittent stationary objects such as poles or posts. The mower assembly includes a stationary platform for being mounted to one side of a mobile machine and a housing concentrically mounted on the platform for rotation relative thereto. The housing includes an upper compartment and a lower deck. A drive assembly is positioned in the upper compartment and is operatively connected to and driven by a power supply. A plurality of blades are positioned beneath the lower deck for being rotated by the drive assembly. A latch assembly is mounted on the housing and cooperates with the platform for movement between a latched position for maintaining the housing in a stationary position relative to the platform in the absence of a laterally-directed force on the latch assembly, and an unlatched position for permitting the housing to rotate around the platform in the presence of a laterally-directed force on the latch assembly by a stationary object as the mower assembly passes to one side of the object. This permits the blade to cut vegetation growing around the stationary object as the mobile machine continues in a straight line path.

A preferred embodiment of a method of practicing the invention includes the step of providing a mower assembly. The mower assembly includes a platform for being mounted on the end of a boom of a mobile machine, and a housing concentrically mounted on the platform for rotation relative thereto. A drive assembly is operatively connected to and driven by a power supply mounted on the platform. A blade is included for being rotated by the drive assembly. A latch assembly is mounted on the housing and cooperates with the platform for movement between a latched position for maintaining the housing in a stationary position in the absence of a laterally-directed force on the latch assembly, and an unlatched position for permitting the housing to rotate around the platform in the presence of a laterally-directed force imposed on the latch assembly by a stationary object as the mower continues in a straight line path. The method also includes the steps of providing a mobile machine, mounting the platform to one side of the mobile machine, and driving the mobile machine in the straight line path. This permits the latch assembly to collide with a stationary object for moving the latch assembly to the unlatched position, thereby causing the housing to rotate around the stationary object as the mobile machine continues in a straight line path.

According to another preferred embodiment of a method for practicing the invention, the step of providing the mobile machine includes the step of mounting a boom to one side of the mobile machine for carrying the mower assembly thereon.

According to yet another preferred embodiment of a method for practicing the invention, the step of mounting the platform to one side of the mobile machine includes the step of mounting the platform on the boom for moving the mower assembly through an arc relative to the mobile machine between a use position wherein the mower assembly is positioned upon a surface to be mowed, and storage position wherein the mower assembly is raised above, and oriented at an angle relative to, the surface for permitting the mower assembly to be moved to another surface to be mowed.

BRIEF DESCRIPTION OF THE DRAWINGS

Some of the objects of the invention have been set forth above. Other objects and advantages of the invention will appear as the invention proceeds when taken in conjunction with the following drawings, in which:

FIGS. 13A through 13F are a series of schematic top plan views of the mower assembly illustrating the manner in which the mower assembly maneuvers around a stationary object.

DESCRIPTION OF THE PREFERRED EMBODIMENT AND BEST MODE

Figure 1:
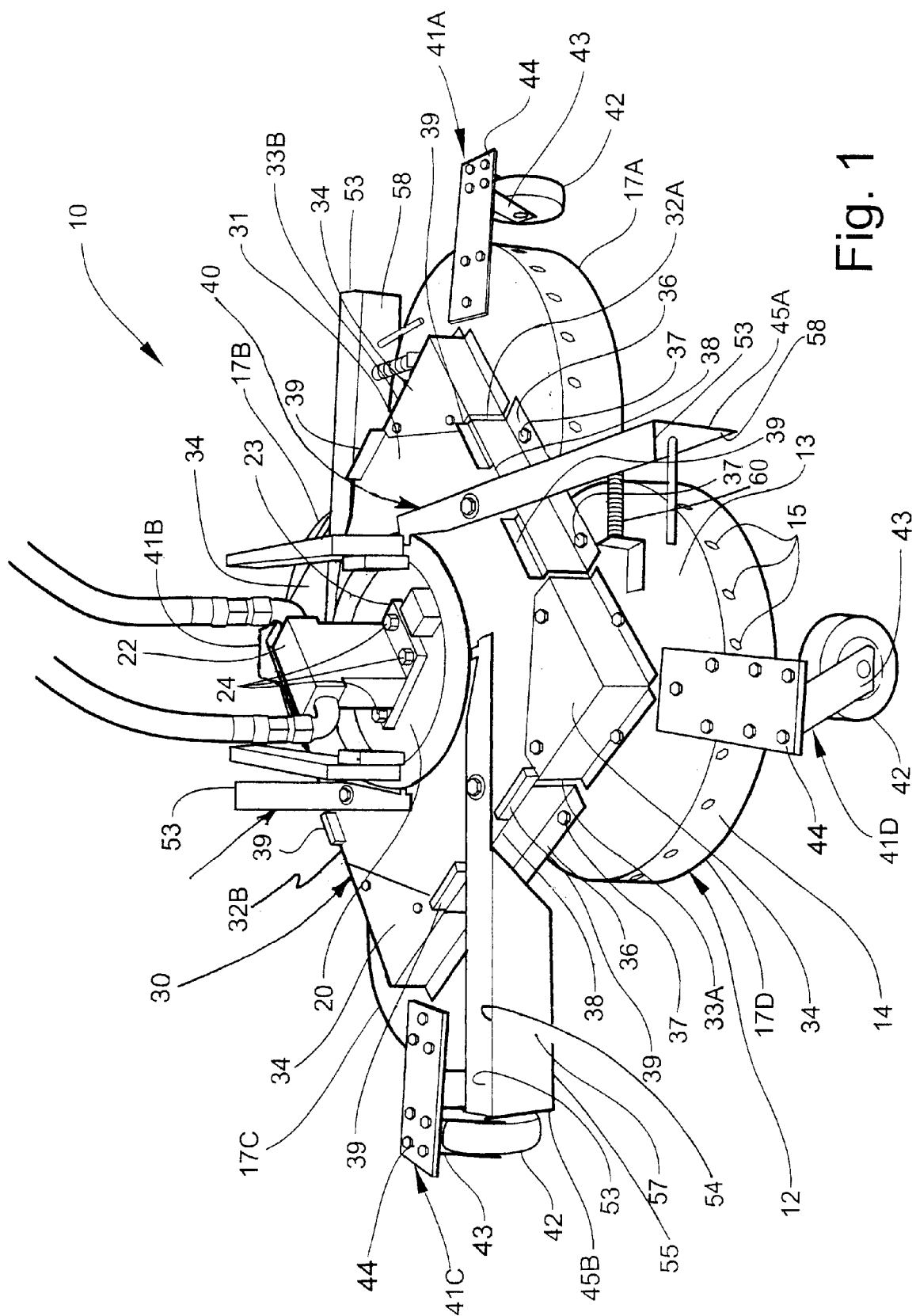
FIG. 1 is a perspective view of a mower according to one preferred embodiment of the invention.

Referring now to the drawings, a mower assembly according to the present invention is illustrated in FIG. 1 and shown generally at reference numeral 10. The mower 10 includes a lower deck 12 that has a platform 13 with an outer edge to which a downwardly-extending skirt 14 is attached. The skirt 14 is preferably connected to the platform 13 using multiple bolts 15. While the skirt 14 may be formed from any suitable material, the skirt 14 is preferably formed from rubber.

Figure 2:
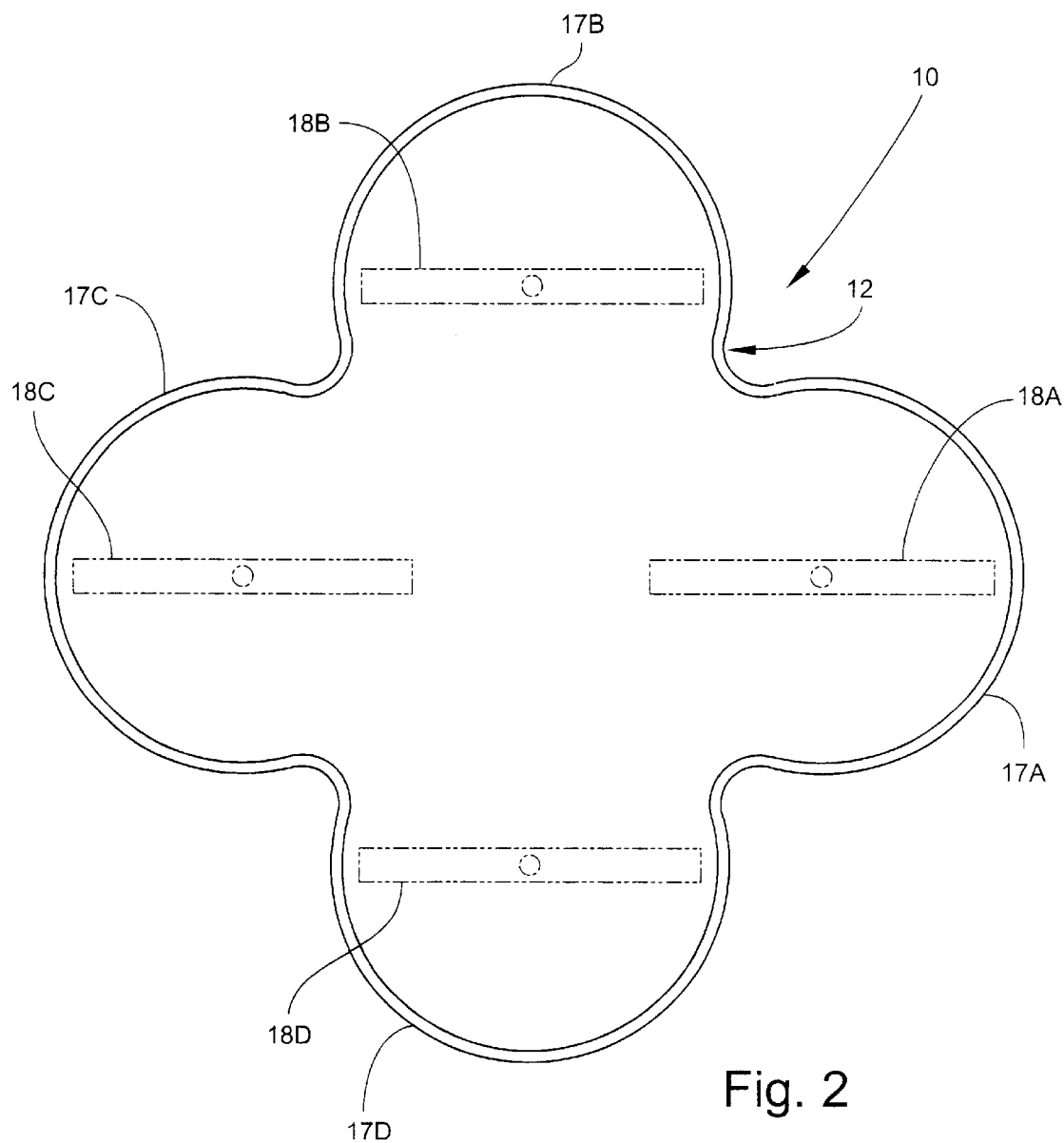
FIG. 2 is a bottom view of the mower assembly according to FIG. 1.

As is shown in FIG. 1, the deck 12 preferably has a quadriform shape. In particular, the skirt 14 and the platform 13 collectively define four lobe-shaped sections 17A, 17B, 17C, and 17D. As is shown in FIG. 2, sections 17A, 17B, 17C and 17D house respective cutting blades 18A, 18B, 18C and 18D. The skirt 14 provides protection from injuries that would otherwise result from rocks and other flying debris thrown from the cutting blades 18A, 18B, 18C and 18D when the mower 10 is in use.

Referring again to FIG. 1, the mower 10 also includes a centrally-located drive plate 20 upon which a hydraulic motor 22 is mounted. The motor 22 is connected to a motor mount plate 23, which is in turn attached to the drive plate 20 using multiple bolts 24. As is discussed in detail below with reference to FIG. 6, the motor 22 is operatively connected to a drive assembly 25 which is positioned within a drive assembly housing 30. The motor 22 provides power to the drive assembly 25 for rotating the blade assemblies 18A, 18B, 18C and 18D.

Referring again to FIG. 1, the drive assembly housing 30 includes an upper platform 31 having an outer edge to which opposing pairs of sidewalls 32A, 32B and 33A, 33B are connected. Access to the drive assembly 25 may be achieved by removing any one of four triangularly-shaped cover plates 34, each of which is attached to a respective one of four corners of the housing 30 and to the platform 13. As is discussed more fully below with reference to FIG. 6, platform 13 rotates around the stationary drive plate 20 using a bearing mechanism 35.

The housing 30 is connected to the platform 13 by four identical brackets 36. The brackets 36 are secured to the platform 13 and respective sidewalls 32A, 32B, 33A, and 33B using multiple bolts 37. Each bracket 36 includes an upper edge 38 to which two spaced-apart stop blocks 39 are connected. The stop blocks 39 protect the plates 34 and a pair of hitch arms 95 (see FIG. 8) from being damaged as the mower 10 is lifted from and lowered onto the ground.

As is shown in FIG. 1, the mower 10 includes a locking assembly 40 that controls the rotational movement of the lower deck 12 and drive assembly housing 30 relative to the drive plate 20. The locking assembly 40 is designed to respond to an impact with a colliding object by releasing the deck 12 and housing 30 from a locked, stationary position relative to the drive plate 20 to an unlocked position in which the deck 12 and housing 30 are permitted to rotate 900 relative to the drive plate 20 before returning to the locked position. See FIGS. 13A–13F. FIG. 1 shows the deck 12 and housing 30 in the locked position.

The mower 10 also includes four wheel assemblies 41A, 41B, 41C, and 41D which are connected to respective sections 17A, 17B, 17C, and 17D of the deck 12. The wheel assemblies 41A, 41B, 41C, and 41D allow the mower 10 to move along the ground in any direction of travel, and permit the lower deck 12 and housing 30 to rotate around the drive plate 20 in response to movement of the locking assembly 40. Each wheel assembly 41A, 41 B, 41 C, and 41 D includes a wheel 42 mounted on a bracket 43. The wheel 42 and bracket 43 are attached to the lower deck 12 using a rectangularly-shaped plate 44. As is shown in FIG. 1, the plate 44 is affixed to the platform 13 adjacent the skirt 14, and is positioned so that the longitudinal axis of the plate 44 radiates outwardly away from the center of the hydraulic motor 22.

Figure 3:
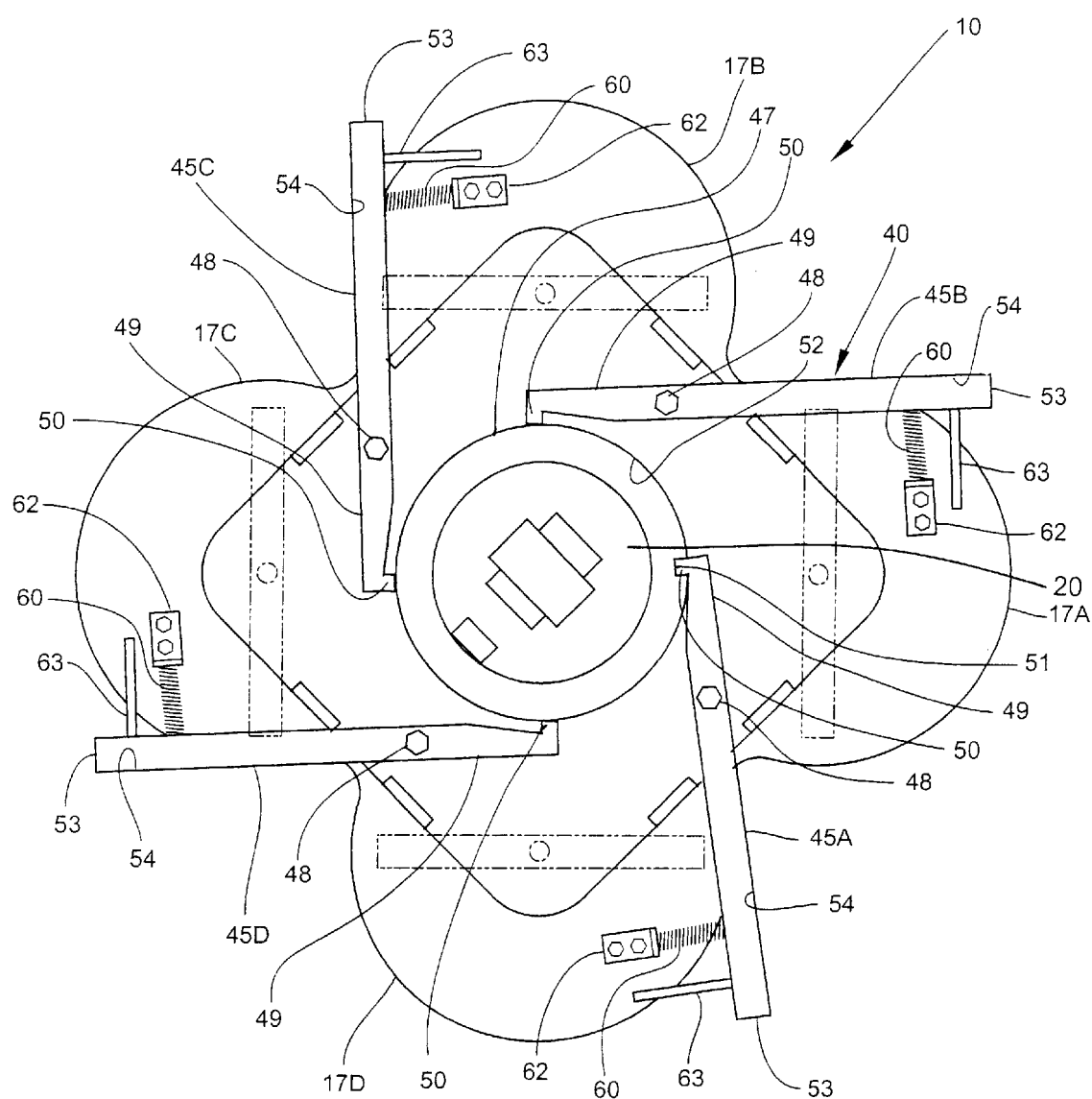
FIG. 3 is a top plan view of the mower assembly according to FIG. 1 with the hydraulic lines and wheel assemblies removed.

Referring now to FIG. 3, the components of the locking assembly 40 are shown. The locking assembly 40 functions as a pawl-and-rachet, and includes four identical lever arms 45A, 45B, 45C and 45D which cooperate with a ring member 47 connected to the outer perimeter of the drive plate 20. Each lever arm 45A, 45B, 45C and 45D is mounted on the platform 13 using one of four pivots 48. Although any suitable type of lever may be employed, each lever arm 45A, 45B, 45C and 45D is preferably a first class lever in which the fulcrum (pivot 48) is positioned between the effort and the load.

As is shown in FIG. 3, each lever arm 45A, 45B, 45C and 45D has a proximal end 49 upon which a hooked tip 50 is formed. The tip 50 is selectively received within a complementary notch 51 defined by the outer edge 52 of the ring member 47. See also FIGS. 13A–13F. Referring again to FIG. 1 and using lever arm 45D as a representative example, the lever arms 45A, 45B, 45C and 45D also each include a distal end 53 having a forward edge 54 to which a vertically-oriented plate 55 is connected. Each plate 55 includes forward and rear faces 57 and 58, respectively (rear face 58 is shown on lever arms 41A and 41 B). The forward face 57 is designed to collide with stationary objects that fall within the path of travel of the mower 10. See FIGS. 13A–13F.

As is shown in FIG. 1 and using lever arms 45A and 45B as representative examples, the rear face 58 cooperates with one of four springs 60 for maintaining a preselected one of the hooked tips 50 positioned within the notch 51 in the absence of a force exerted on the forward face 57 by a colliding object. Although any suitable type of spring or other tensioning device may be used, each spring 60 is preferably a compression spring. FIG. 3 shows all four of the springs 60 maintaining the locking assembly 40 in the locked position, with the hooked tip 50 of lever arm 45A positioned within the notch 51.

Figure 4:
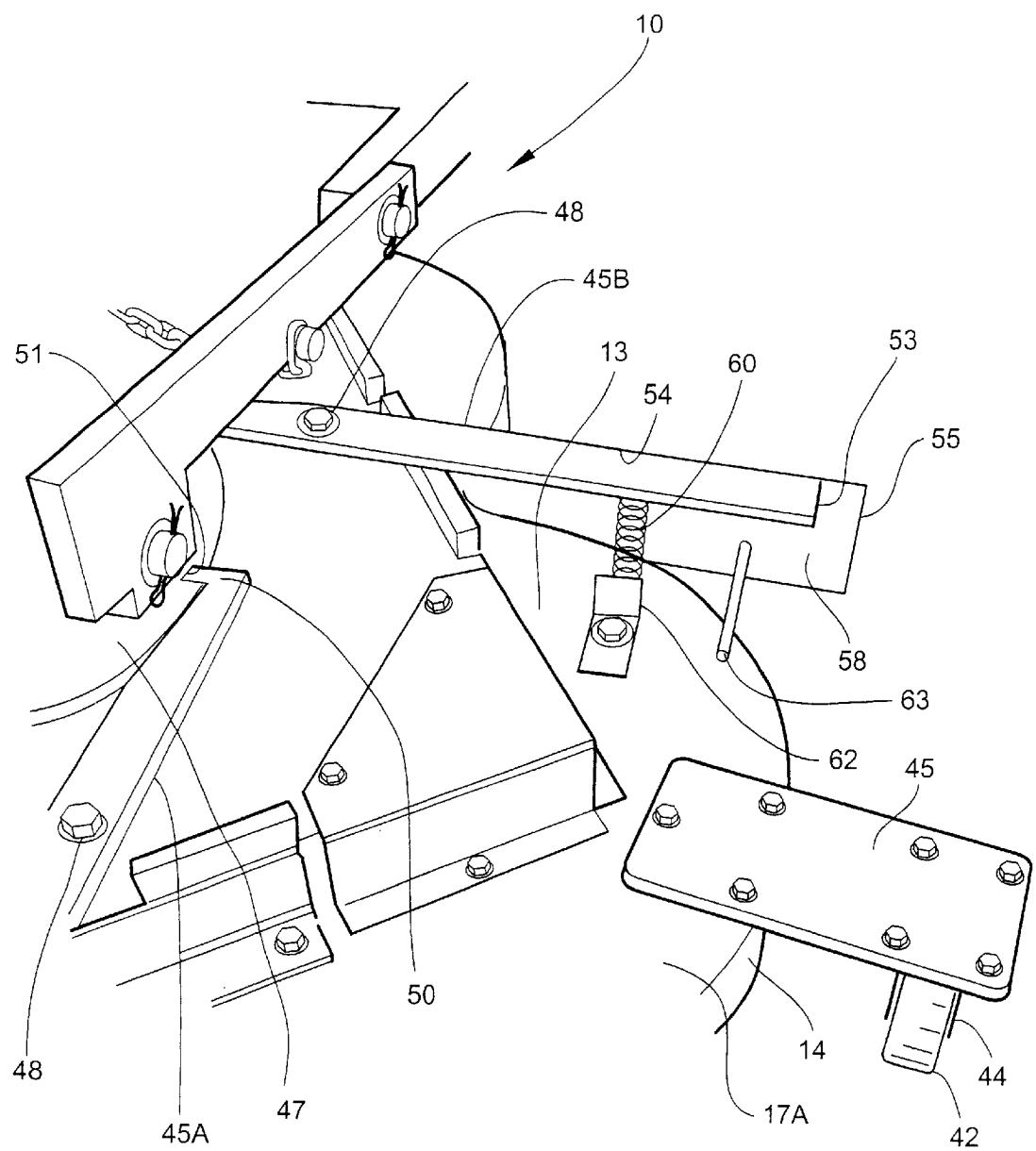
FIG. 4 is a partial perspective view of the mower assembly according to FIG. 1 with the wheel assemblies removed.

Referring now to FIG. 4 and using lever arm 45B as a representative example, each spring 60 is connected to the platform 13 using an L-shaped bracket 62. The spring is positioned on the bracket 62 so that the longitudinal axis of the spring 60 extends perpendicularly to the longitudinal axis of the lever arm 45B. A small rod 63 is mounted on the rear face 58 of plate 55. The rod 63 extends outwardly away from and at a perpendicular angle to the rear face 58, and is used to guide the grass and other vegetation as it passes beneath the deck 12 so that the space between the rear face 58 and that portion of the skirt 14 located adjacent to the distal end of the lever arm 45B does not become clogged while the mower 10 is in use.

Figure 5:
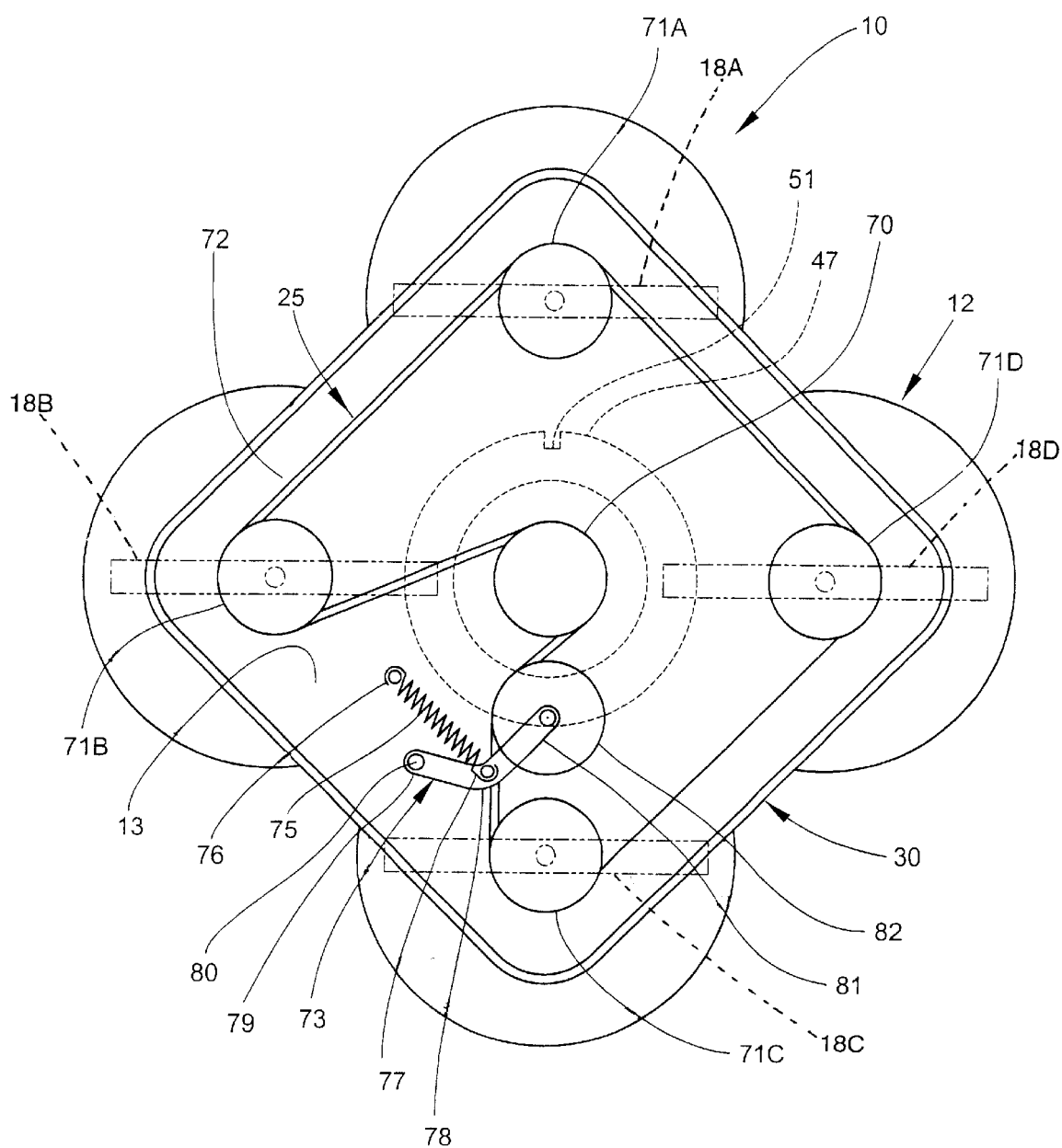
FIG. 5 is a schematic top plan view of the mower assembly according to FIG. 1 with the hydraulic lines and wheel assemblies removed.

Referring now to FIG. 5, the cutting blades 18A, 18B, 18C and 18D are rotated by drive assembly 25. The drive assembly 25 is positioned within the drive housing 30, and includes a centrally-positioned drive pulley 70, four spaced-apart driven pulleys 71A, 71B, 71C and 71D, an endless drive belt 72, and a tensioning assembly 73. The drive belt 72 is mounted for motion on the driven pulleys 71A, 71B, 71C and 71D, and is driven by drive spindle 70. The tensioning assembly 73 is used to maintain a preselected amount of tension on the drive belt 72, and includes a spring 75 having a first hooked end 76 connected to the platform 13, and a second hooked end 77 connected to the central region of a lever arm 78. The lever arm 78 has a first end 79 which is connected by a pivot 80 to platform 13, and second end 81 which is connected to a driven spindle 82. While a lever arm having any suitable shape may be used, lever arm 78 preferably has a shape resembling that of a boomerang, which enhances the torque on the spindle 82 resulting from the force applied by the spring 75 on lever arm 78. In addition, any suitable pulleys or drive belts may be used. However, each pulley 70, 71A, 71B, 71C, 71D and 82 is preferably a pulley sold by John Deere, and which has a 7 inch diameter. The drive belt 72 is preferably a double-V belt.

Figure 6:
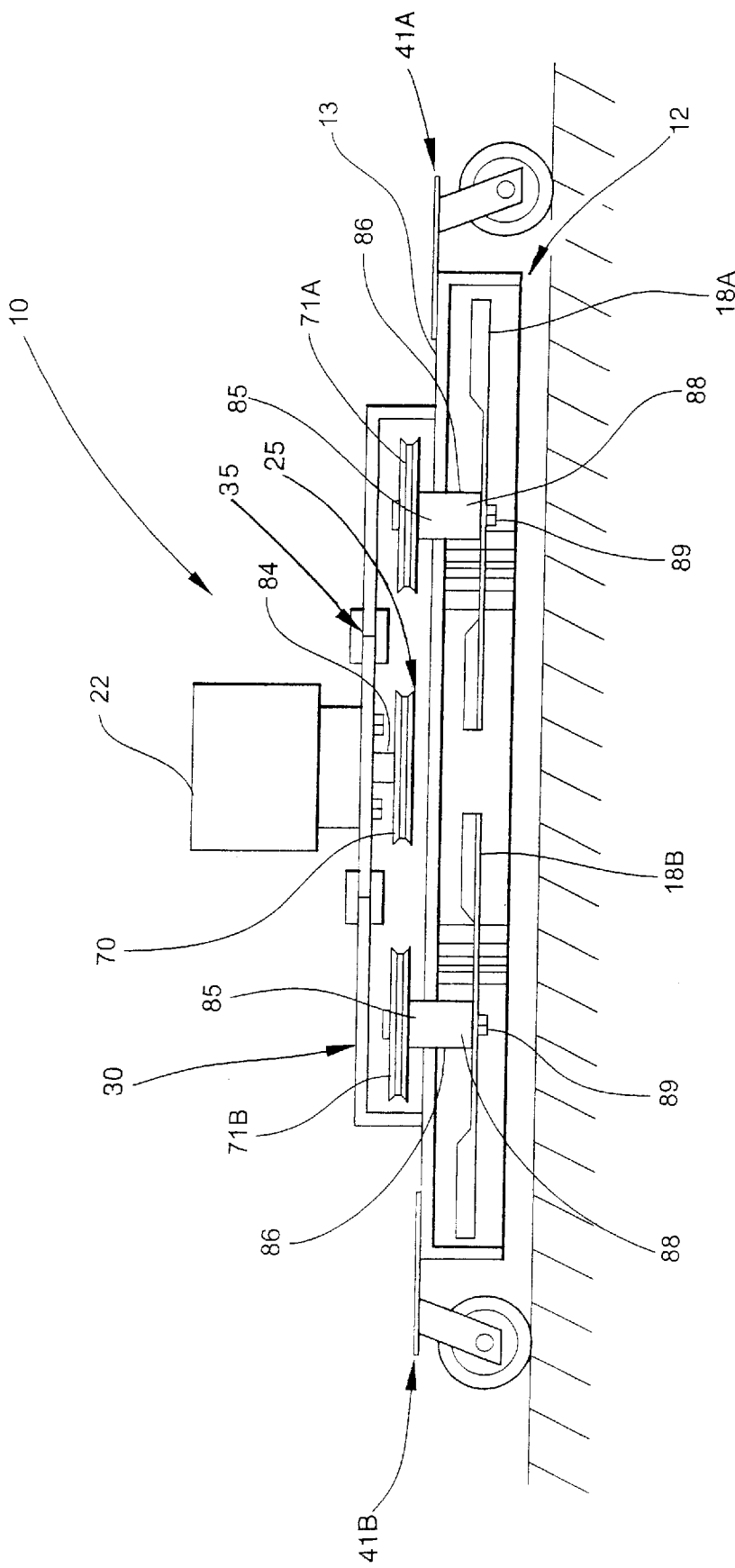
FIG. 6 is a cross-sectional side view of the mower assembly.

Referring now to FIG. 6, the drive assembly 25 is shown with the drive belt 72 removed so that the manner in which the drive pulley 70 and driven pulleys 71A, 71B, 71C and 71D are positioned within the drive system housing 30 may be shown. Drive pulley 70 is mounted on the output shaft 84 of hydraulic motor 22. Using driven pulleys 71A and 71B as representative examples, driven pulleys 71A, 71B, 71C and 71D are mounted on the respective first ends 85 of drive shafts 86. Each drive shaft 86 extends through the platform 13 and has a second end 88 positioned beneath the deck 12. As is shown in FIG. 6, cutting blades 18A and 18B are connected to respective second ends 88 of the drive shafts 86 using respective bolts 89.

Figure 7:
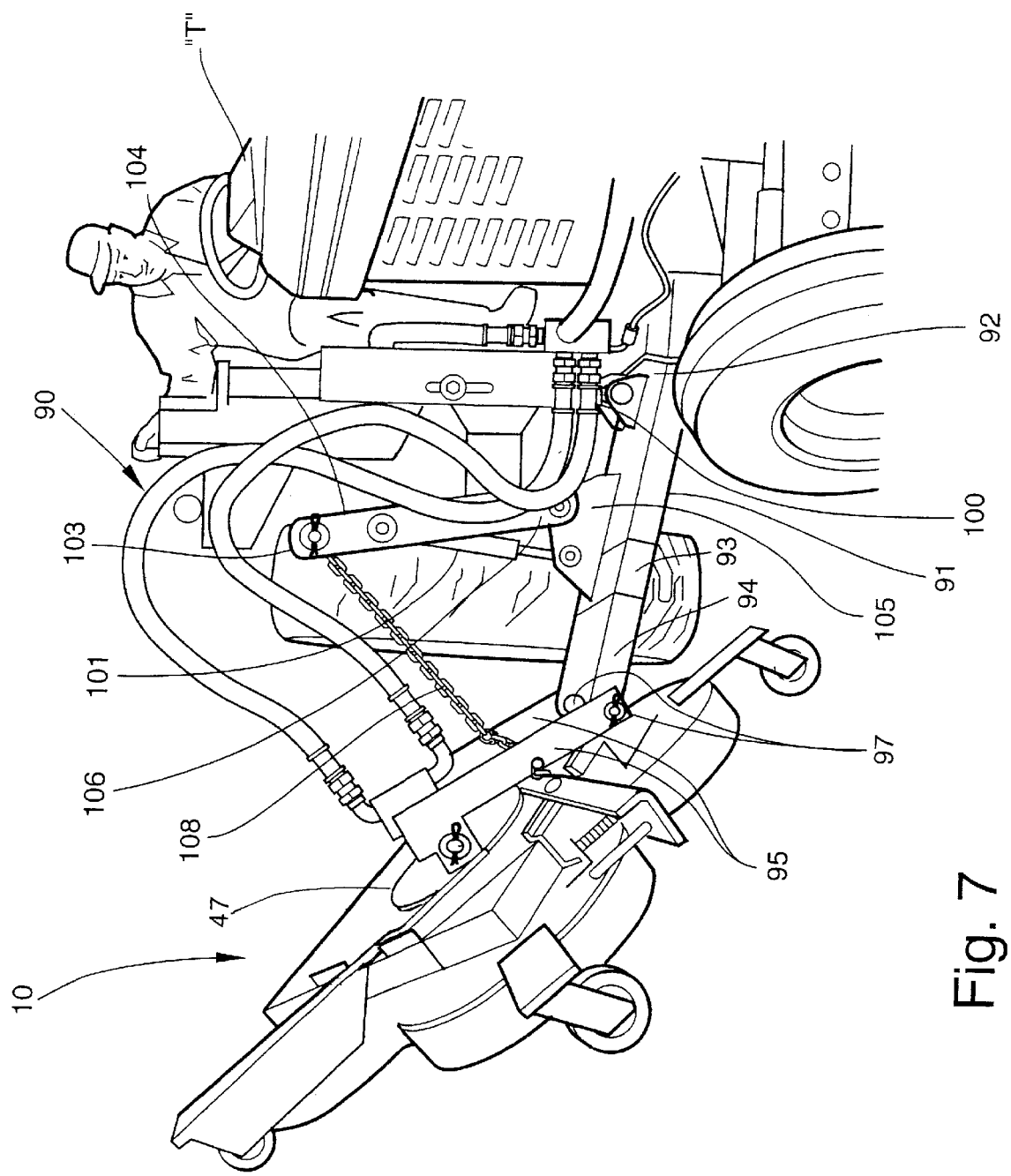
FIG. 7 is an environmental perspective view of the mower assembly being lifted using a hydraulic boom installed on a conventional tractor.

Referring now to FIG. 7, the mower 10 is shown connected to a hydraulic boom assembly 90 which is mounted on a tractor "T". While any suitable boom assembly may be utilized, the mower 10 is preferably connected to a conventional hydraulic lifting arm such as that sold by the Alamo Group, Inc. under the trademark VERSA. The boom assembly 90 includes an outer boom arm 91 having a proximal end 92 connected by a pivot to the tractor "T", and a distal end 93 upon which a hitch member 94 is mounted. As is shown in FIG. 7, the mower 10 includes a pair of spaced-apart hitch arms 95 that are connected to the ring member 47. Each hitch arm 95 is also connected to the hitch member 94 using one of two pivots 97.

Movement of the boom arm assembly 90 and the mower 10 connected thereto is controlled by lifting and tilting pistons 100 and 101, respectively. Lifting piston 100 is shown in FIG. 7 in a contracted position. Placing lifting piston 100 in the contracted position causes the distal end 93 of outer boom arm 91 and the mower 10 to be lifted off of the ground or other surface upon which it is positioned. See FIG. 10. Placing the lifting piston 100 in a fully extended position lowers the distal end 93 of the boom arm 91, so that the mower 10 is returned to the ground or other surface. See FIG. 9.

Figure 8:
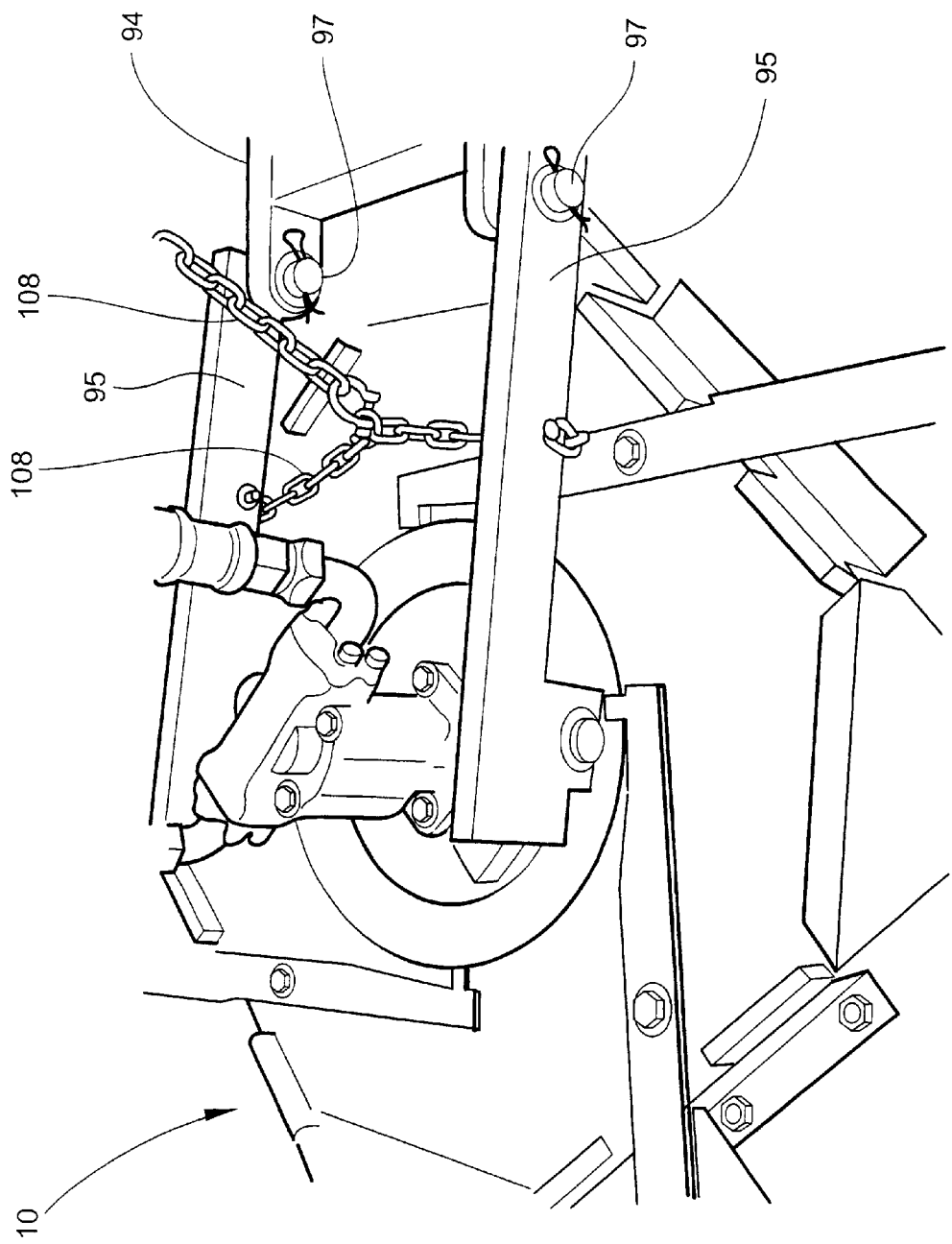
FIG. 8 is a partial perspective view of the mower assembly according to FIG. 7.

Referring again to FIG. 7, the tilting piston 101 interconnects one end 103 of an ancillary boom arm 104 with a base 105 upon which the other end 106 of the ancillary boom arm 104 is pivotally mounted. End 103 of ancillary boom arm 104 and hitch arms 95 are interconnected by a Y-shaped chain 108. The manner in which the chain 108 is connected to the hitch arms 95 is shown in FIG. 8. Referring again to FIG. 7, using the chain 108 to interconnect the hitch arms 95 with the end 103 of the boom arm 104 permits the hitch arms 95 to pivot around respective pivots 97 and move through an arc relative to hitch member 94 in response to movement of the tilting piston 101 and boom arm 104.

Figure 9:
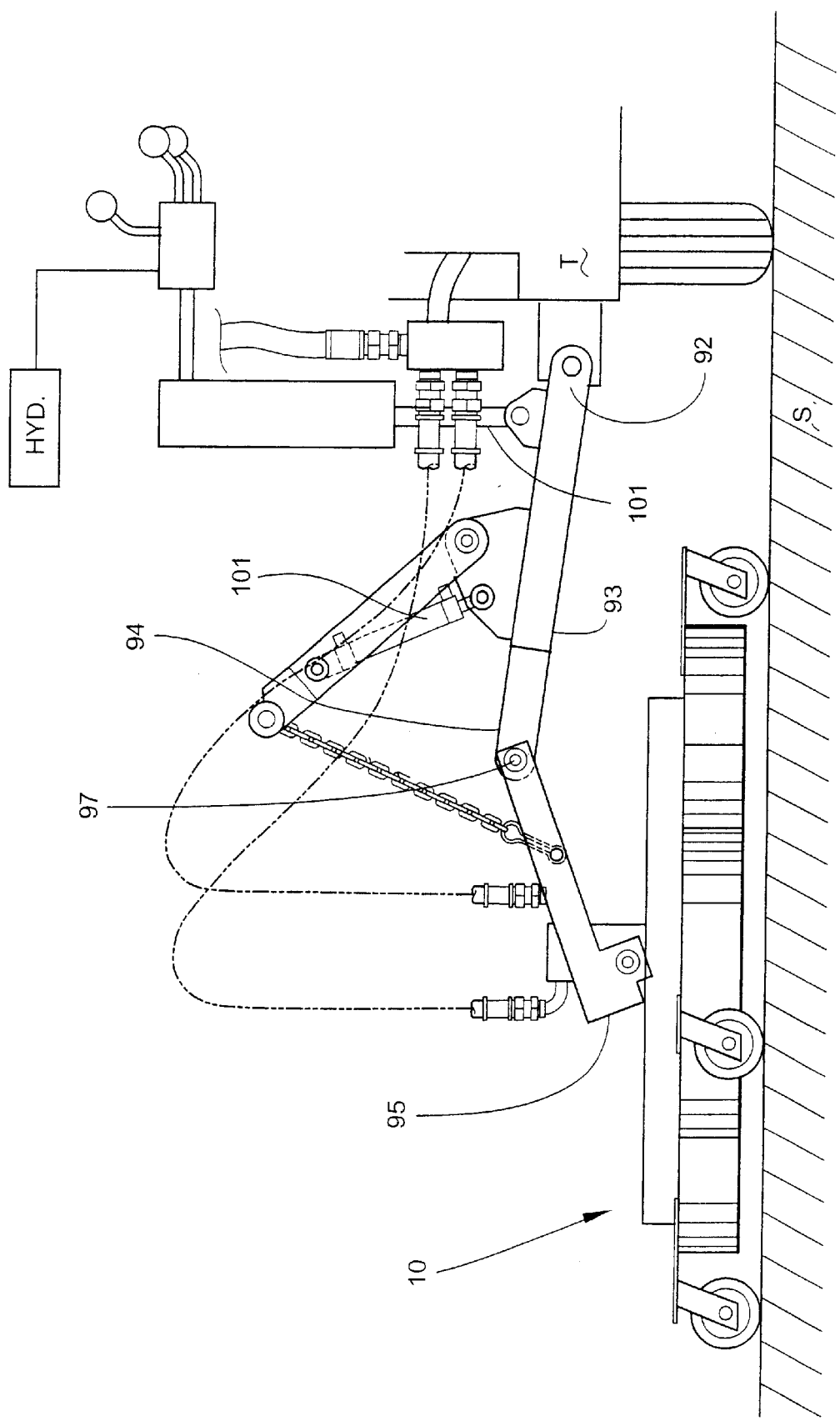
FIG. 9 is a schematic side view of the mower assembly installed on the hydraulic boom of a mobile machine.
Figure 10:
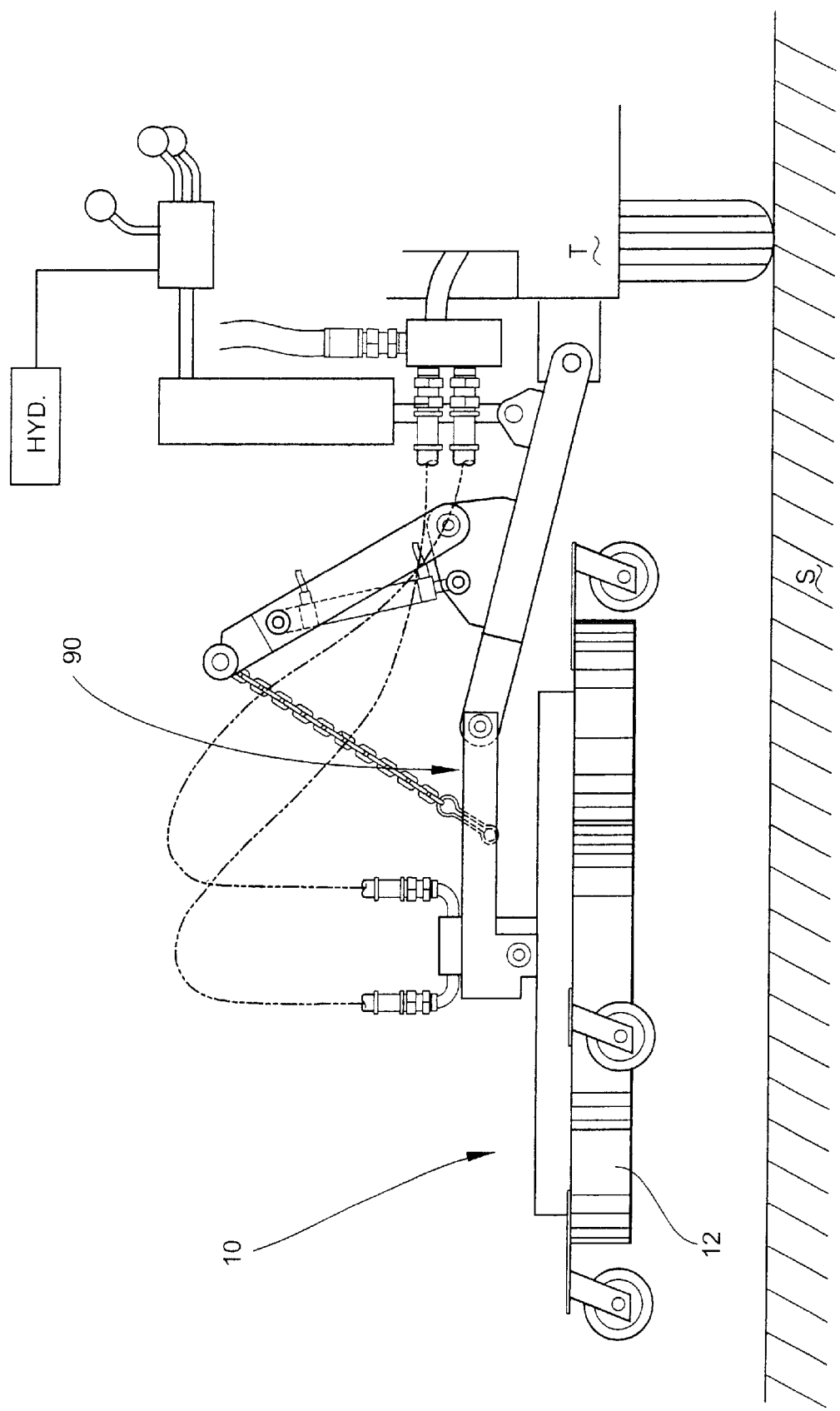
FIG. 10 is a schematic side view of the mower assembly according to FIG. 9 showing the lifting piston of the hydraulic boom in a fully contracted position.
Figure 11:
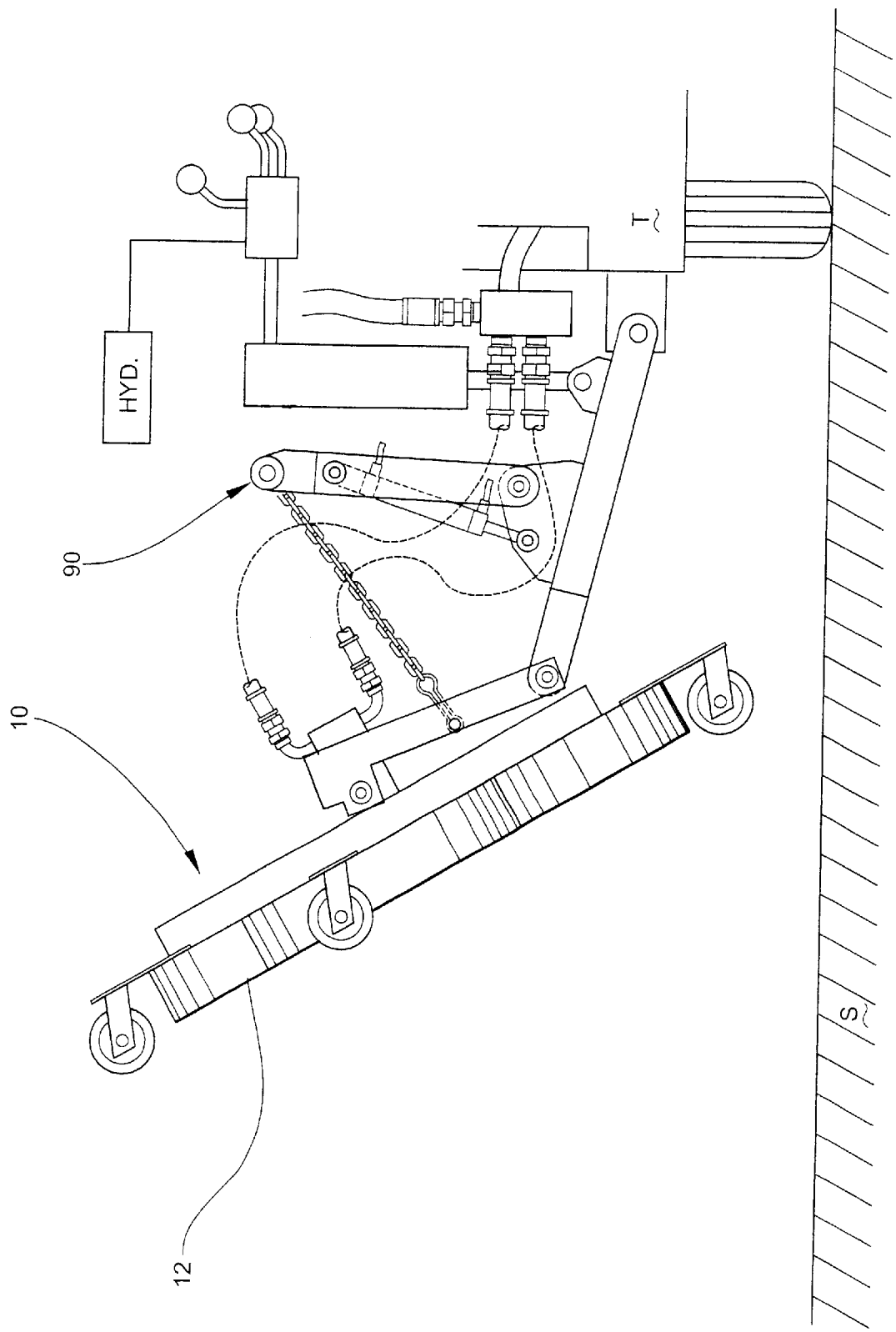
FIG. 11 is a schematic side view of the mower assembly according to FIG. 9 showing the lower deck of the mower assembly elevated above and positioned at an angle of approximately 45° relative to the surface upon which the mobile machine is resting.
Figure 12:
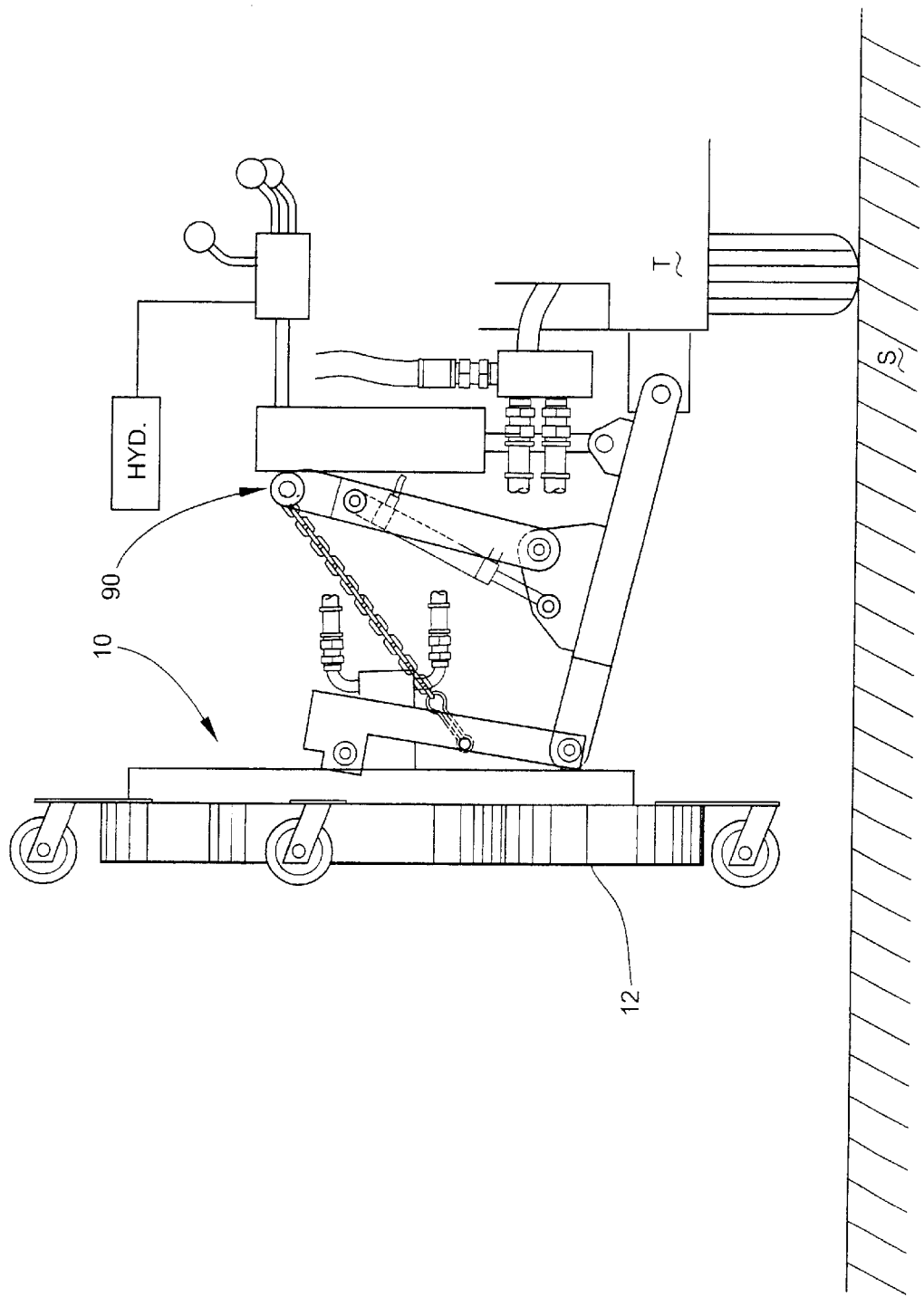
FIG. 12 is a schematic side view of the mower assembly according to FIG. 9 showing the lower deck of the mower assembly positioned at an angle of approximately 180° relative to the surface upon which the mobile machine is resting.

Referring now to FIGS. 9 through 12, the manner in which the boom arm assembly 90 is used to raise and lower the mower 10 is shown. FIG. 9 shown the mower 10 placed on a surface "S" to be mowed, and FIG. 10 shows the mower 10 raised above and positioned parallel to the surface "S". In FIG. 11, the mower 10 is shown placed in a temporary transport position with the deck 12 placed at a 45° angle to the surface "S", which allows the tractor "T" and attached mower 10 to be quickly and easily moved from one mowing site to another. FIG. 12 shows the mower 10 placed in a storage position in which the deck 12 is positioned at an angle perpendicular to the surface upon which the tractor "T" rests.

Figure 13D:
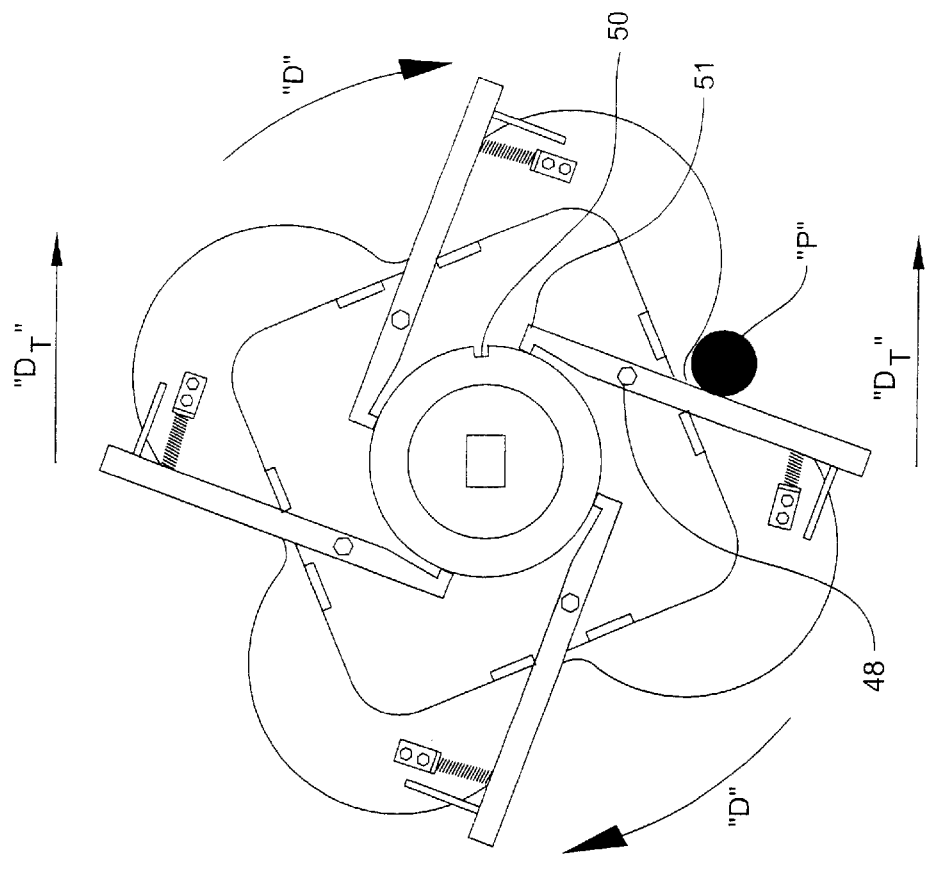
Figure 13C:
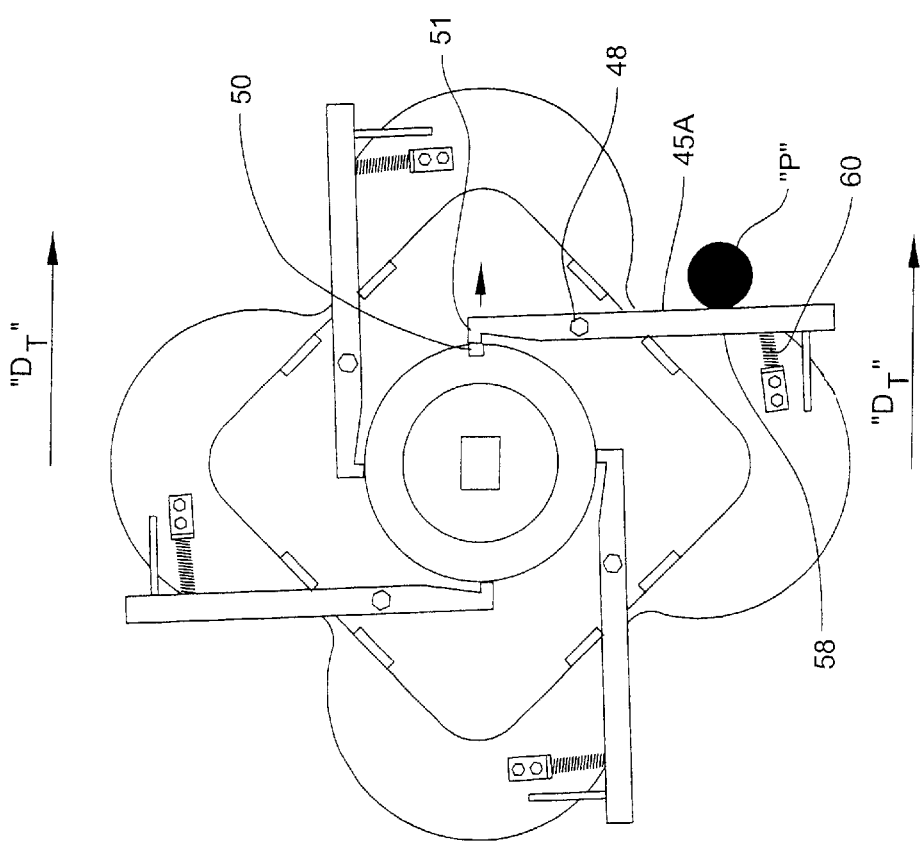

Referring now to FIGS. 13A through 13F, the manner in which the mower 10 maneuvers around a stationary object is shown. Although the stationary object shown in FIGS. 13A through 13F is a post "P", the mower 10 is capable of maneuvering around a variety of stationary objects, including but not limited to guard rails, trees, telephone poles, small utility boxes, and signposts. The mower 10 is shown in FIGS. 13A through 13F continuously traveling in a fixed direction "$D_T$". As is shown in FIG. 13A, the mower 10 travels toward the post "P", which inevitably results in a collision between the post "P" and the lever arm 45A. See FIG. 13B. Upon colliding with the mower 10, the stationary post "P" exerts a force "$F_1$" on the lever arm 45A, which causes lever arm 45A to begin rotating in a counterclockwise direction "D" around pivot 48. As is shown in FIG. 13C, this counterclockwise rotation causes lever arm 45A to exert a force "$F_2$" on the spring 60, which causes the spring 60 to compress. This in turn releases the hooked tip 51 from its position within notch 50 on ring member 47. As is shown in FIG. 13D, the lever arm 45A will continue to rotate counterclockwise about the pivot 48 until the rear face 58 of the lever arm 45A collides with stop plate 39. Throughout this process, the mower 10 continues to travel in the fixed direction "$D_T$" shown. Once the hooked tip 51 is released, the lower deck 12, drive shaft housing 30 and lever arms 45A through 45D begin to rotate around the drive plate 20 in the counterclockwise direction shown in FIGS. 13D and 13E in response to the rotation of lower deck 12 and upper housing 30 around drive plate 20.

As the mower 10 gradually travels past the post "P", the continuous counterclockwise rotation of lower deck 12 and housing 30 around the drive shaft 20 causes the force "$F_1$" exerted by the post "P" on lever arm 45A to gradually decrease and the spring 60 to expand while the distance between the post "P" and the pivot 48 simultaneously decreases. As is shown in FIG. 13F, the counterclockwise rotation continues until the mower 10 travels past the post "P" so that the post "P" is eventually positioned past the concave region of the skirt 14 where sections 17A and 17D of deck 12 converge, rotation stops completely when the hooked tip 51 on the proximal end of lever arm 45B is received within notch 50 on ring member 47. The mower 10 rotates 90° from the position shown in FIG. 13A to arrive at the position shown in FIG. 13F. Should the lever arm 45B collide with another post "P", the entire process described with reference to FIGS. 13A through 13F will repeat itself, resulting in another 90° rotation of the deck 12 and housing 30 around the drive plate 20, ending with placement of the hooked tip 51 on lever arm 45C within notch 50. The mower 10 will respond to successive collisions by rotating in 90° increments in a manner identical to that described above.

In the embodiment described above, the deck 12 has a quadriform shape, and the mower 10 includes four cutting blades. However, any number of blades may be utilized. Furthermore, provided that the deck is still capable of rotating in the manner described above with reference to FIGS. 13A through 13F, the deck 12 may have any suitable shape.

A rotating mower assembly has been disclosed. Various details of the invention may be changed without departing from its scope. Furthermore, the foregoing description of the preferred embodiments of the invention and the best mode for practicing the invention are provided for the purpose of illustration only and not for the purpose of limitation—the invention being defined by the claims.

I claim:

1. A mower assembly for cutting vegetation growing in an open area and around intermittent stationary objects such as poles or posts, comprising:
    (a) a stationary platform for being mounted to one side of a mobile machine;
    (b) a housing mounted on said platform for rotation relative thereto;
    (c) a drive assembly operatively connected to and driven by a power supply;
    (d) a blade for being rotated by said drive assembly; and
    (e) a latch assembly, including a lever mounted on the housing and slidably engaging an outer sidewall of the platform for moving the latch assembly between:
        (i) a latched position for maintaining the housing in a stationary position relative to the platform in the absence of a laterally-directed force on said latch assembly; and
        (ii) an unlatched position for permitting the housing to rotate around the platform in the presence of a laterally-directed force imposed on the latch assembly by a stationary object as the mower assembly passes to one side of the object,
        thereby permitting said blade to cut vegetation growing around the stationary object as the mobile machine continues in a straight line path.

2. A mower assembly according to claim 1, wherein said latch assembly comprises a plurality of spaced-apart levers mounted on the housing and slidably engaging the outer sidewall of the platform for moving the latch assembly between said latched and unlatched positions.

3. A mower assembly according to claim 2, wherein each of said levers comprises a first end for receiving the laterally-directed force, and a second end for being selectively received within a complementary notch defined by said outer sidewall.

4. A mower assembly according to claim 3, wherein each of the levers is mounted on the housing using a pivot positioned intermediate said first and second ends for permitting pivotal movement of the lever relative to the housing in response to an increase or decrease in the laterally-directed force on the first end.

5. A mower assembly according to claim 3, wherein each of the levers further comprises a post attached to the housing adjacent to said first end of the lever and extending outwardly away therefrom for guiding vegetation beneath the housing as the lever pivots relative thereto.

6. A mower assembly according to claim 3, wherein said first end of the lever includes a vertically-oriented planar surface adapted for abutting engagement with the stationary object, thereby producing the laterally-directed force on said planar surface for moving the latch assembly to the unlatched position.

7. A mower assembly according to claim 6, wherein each of the levers further comprises a spring mounted on the first end and extending perpendicularly to said planar surface of the lever for maintaining the second end of the lever in a tensioned condition against the platform in the absence of the laterally-directed force on the planar surface.

8. A mower assembly according to claim 7, wherein said spring comprises a compression spring.

9. A mower assembly according to claim 3, 4, 5, 6, 7 or 8, wherein said second end comprises a hooked tip.

10. A mower assembly according to claim 1, wherein said power supply comprises a motor mounted on the platform.

11. A mower assembly according to claim 10, wherein said motor comprises a hydraulic motor.

12. A mower assembly according to claim 10, wherein the motor is operatively connected to and driven by a power supply positioned on the mobile machine.

13. A mower assembly according to claim 1, wherein said drive assembly includes a centrally-positioned drive shaft extending through said platform and interconnecting said power supply with said blade for rotating the blade.

14. A mower assembly according to claim 13, wherein said housing comprises an upper compartment in which the drive assembly is positioned and a lower deck beneath which the blade is positioned.

15. A mower assembly according to claim 14, wherein said lower deck comprises a quadriform platform having a peripheral side edge to which a downwardly-extending skirt is connected, thereby defining an interior within which the blade is positioned.

16. A mower assembly according to claim 15, and including a plurality of blades rotatably mounted on an underside of said quadriform platform for being rotated by the drive assembly.

17. A mower assembly according to claim 14, wherein the drive assembly includes a drive pulley carried on said drive shaft and a plurality of driven pulleys carried on respective driven shafts, said driven pulleys interconnected with said drive pulley by an endless drive belt for rotation therewith.

18. A mower assembly according to claim 14, wherein the drive assembly includes a plurality of driven shafts operatively connected to said drive shaft for rotation therewith.

19. A mower assembly according to claim 18, wherein the drive assembly further comprises a drive pulley positioned within the upper compartment and carried by the drive shaft for rotation therewith.

20. A mower assembly according to claim 19, wherein each of said driven shafts includes a first end positioned within the upper compartment and upon which a driven pulley is mounted, and a second end positioned beneath the lower deck and upon which a respective one of said blades is mounted, thereby permitting the blade to rotate simultaneously with the rotation of the drive shaft.

21. A mower assembly according to claim 20, wherein said drive and driven pulleys are interconnected by an endless drive belt for permitting the blades to rotate with the drive shaft.

22. A mower assembly for cutting vegetation growing in an open area and around intermittent stationary objects such as poles or posts, comprising:

(a) a stationary platform for being mounted to one side of a mobile machine;

(b) a housing concentrically mounted on said platform for rotation relative thereto and including an upper compartment and a lower deck;

(c) a drive assembly positioned in said upper compartment and operatively connected to and driven by a power supply;

(d) a plurality of blades positioned beneath said lower deck for being rotated by said drive assembly; and;

(e) a latch assembly including a lever mounted on the housing and slidably engaging the outer sidewall of the platform for moving the latch assembly between:

(i) a latched position for maintaining the housing in a stationary position relative to the platform in the absence of a laterally-directed force on said latch assembly; and (ii) an unlatched position for permitting the housing to rotate around the platform in the presence of a laterally-directed force imposed on the latch assembly by a stationary object as the mower assembly passes to one side of the object, thereby permitting the blades to cut vegetation growing around the stationary object as the mobile machine continues.in a straight line path.

23. A method for mowing around intermittent stationary objects, comprising the steps of:

(a) providing a mower assembly including a stationary platform for being mounted to one side of a mobile machine, a housing concentrically mounted on said platform for rotation relative thereto, a drive assembly operatively connected to and driven by a power supply, a blade positioned for being rotated by said drive assembly, and a latch assembly including a lever mounted on the housing and slidably engaging the platform for moving the latch assembly between:

(i) a latched position for maintaining the housing in a stationary position in the absence of a laterally-directed force on said latch assembly; and (ii) an unlatched position for permitting the housing to rotate around the platform in the presence of a laterally-directed force imposed on the latch assembly by a stationary object as the mower continues in a straight line path;

(b) providing a mobile machine;

(c) mounting the platform to one side of the mobile machine;

(d) driving the mobile machine in the straight line path;

(e) permitting said lever to collide with a stationary object for moving the latch assembly to the unlatched position, thereby causing the housing to rotate around the stationary object as the mobile machine-continues in a straight line path.

24. A method according to claim 23, wherein the step of providing the mobile machine includes the step of mounting a boom to one side of the mobile machine for carrying the mower assembly thereon.

25. A method according to claim 23, wherein the step of mounting the platform to one side of the mobile machine includes the step of mounting the platform on said boom for moving the mower assembly through an arc relative to the mobile machine and between a use position wherein the mower assembly is positioned upon a surface to be mowed, and an elevated position wherein the mower assembly is raised above, and oriented at an angle relative to, the surface for permitting the mower assembly to be moved to another surface to be mowed.

* * * * *